United States Patent
Cowan et al.

(10) Patent No.: US 10,275,513 B1
(45) Date of Patent: Apr. 30, 2019

(54) PROVIDING APPLICATION FUNCTIONALITY

(71) Applicant: Google Inc., Mountain View, CA (US)

(72) Inventors: Mathew Cowan, New York, NY (US); Christopher Pedregal, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 428 days.

(21) Appl. No.: 13/929,377

(22) Filed: Jun. 27, 2013

Related U.S. Application Data (60) Provisional application No. 61/713,411, filed on Oct. 12, 2012.

(51) Int. Cl.
  *G06F 17/30* (2006.01)
  *G06N 3/08* (2006.01)

(52) U.S. Cl.
  CPC .......... *G06F 17/3061* (2013.01); *G06N 3/08* (2013.01)

(58) Field of Classification Search
  USPC ........................................................ 706/12
  See application file for complete search history.

(56) References Cited

U.S. PATENT DOCUMENTS

| | | | |
|---|---|---|---|
| 2011/0106736 A1* | 5/2011 | Aharonson et al. | 706/12 |
| 2012/0123993 A1* | 5/2012 | Wang et al. | 706/52 |
| 2013/0159220 A1* | 6/2013 | Winn et al. | 706/12 |
| 2013/0218825 A1* | 8/2013 | Zhang et al. | 706/52 |
| 2013/0226856 A1* | 8/2013 | Zhang et al. | 706/52 |
| 2013/0238686 A1* | 9/2013 | O'Donoghue | G06Q 30/02 709/203 |

* cited by examiner

*Primary Examiner* — Aleksandr Kerzhner
*Assistant Examiner* — Giuseppi Giuliani
(74) *Attorney, Agent, or Firm* — Middleton Reutlinger (57) ABSTRACT

A system is configured to obtain data for a user. The data may describe actions that the user has performed in an application and identify points in time associated with the actions. A point in time may include a point in time at which one of the actions was performed. The system is configured to analyze the data to determine, for each action, a score for each point in time. The score, for a particular point in time, may be determined based on one or more points in time at which the action was performed, and may be determined from a number of times that the action was performed at the particular point in time. The system is configured to provide the user with a functionality to perform a particular action based on the scores determined for the particular action for the set of points in time.

21 Claims, 6 Drawing Sheets

PROVIDING APPLICATION FUNCTIONALITY

RELATED APPLICATION

This application is a non-provisional of U.S. Provisional Application No. 61/713,411, filed Oct. 12, 2012, the contents of which are incorporated herein by reference.

BACKGROUND

This specification relates to providing notifications.

User devices, e.g., cell phones, tablets, personal assistant devices, computers, etc., provide users with information. Users can request specific information that is of interest to the user. For example, user devices can provide users with contact information, upcoming calendar events, traffic information, weather information, as well as any Internet accessible information requested by the user. User devices also provide notifications to users. For example, when a cell phone receives a call, the cell phone may provide a visual notification, e.g., a screen may display call information, an audible notification, e.g., a speaker may generate a ring tone, and/or a sensory notification, e.g., a motor causing vibrations. The user experience of a user device can depend on its ability to provide helpful notifications to the user.

SUMMARY

This specification describes technology relating to providing application functionalities.

According to some possible implementations, a method, performed by one or more computer devices, may include obtaining data for a user, where the data may describe a set of actions that the user has performed in an application, where the data may identify points in time associated with the set of actions, and where each of one or more of the points in time, associated with one of the set of actions, may include a point in time at which the one of the set of actions was performed; analyzing the data to determine, for each action of one or more of the set of actions, a score for each of a set of points in time, where the score, for a particular point in time of the set of points in time, may be determined based on the one or more of the points in time at which the action was performed, and may be determined from a number of times that the action was performed at the particular point in time; and providing the user with a functionality to perform a particular action, of the one or more of the set of actions, at one of the set of points in time based on the scores determined for the particular action for the set of points in time.

According to some possible implementations, providing the user with the functionality may include providing the user with one or more links, where the particular action may be performed based on selection of the one or more links.

According to some possible implementations, obtaining the data for the user may include obtaining a histogram that identifies a number of times that each of the set of the actions has been performed at each of the set of points in time.

According to some possible implementations, the data describing the set of actions may further identify a set of geolocations and a set of client devices associated with each of the points in time.

According to some possible implementations, the score is a first score, and the method further may include analyzing the data to determine, for each action of the one or more of the set of actions, a second score for each of the set of geolocations, where the second score, for a particular geolocation of the set of geolocations, may be determined from a number of times that the user performed the action at the particular geolocation; and analyzing the data to determine, for each action of the one or more of the set of actions, a third score for each of the set of client devices, where the third score, for a particular client device of the set of client devices, may be determined from a number of times that the user performed the action using the particular client device.

According to some possible implementations, providing the user with the functionality to perform the particular action may include identifying the first score for the one of the set of points in time; identifying the second score for one of the set of geolocations associated with the user at the one of the set of points in time; identifying the third score for one of the set of client devices associated with the user at the one of the set of points in time; determining that each of the first score, the second score, and the third score satisfies a respective threshold; and providing the user with the functionality to perform the particular action when each of the first score, the second score, and the third score satisfies the respective threshold.

According to some possible implementations, providing the user with the functionality to perform the particular action may include identifying the first score for the one of the set of points in time; identifying the second score for one of the set of geolocations associated with the user at the one of the set of points in time; identifying the third score for one of the set of client devices associated with the user at the one of the set of points in time; generating an overall score based on a combination of the first score, the second score, and the third score; determining that the overall score satisfies a threshold; and providing the user with the functionality to perform the particular action when the overall score satisfies the threshold.

According to some possible implementations, a system may include one or more computers to: obtain data for a user, where the data may describe a set of actions that the user has performed in an application, where the data may identify points in time associated with the set of actions, and where each of one or more of the points in time, associated with one of the set of actions, may include a point in time at which the one of the set of actions was performed; analyze the data to determine, for each action of one or more of the set of actions, a score for each of a set of points in time, where the score, for a particular point in time of the set of points in time, may be determined based on the one or more of the points in time at which the action was performed, and may be determined from a number of times that the action was performed at the particular point in time; and provide the user with a functionality to perform a particular action, of the one or more of the set of actions, at one of the set of points in time based on the scores determined for the particular action for the set of points in time.

According to some possible implementations, the one or more computers, when providing the user with the functionality, may provide the user with one or more links, where the particular action may be performed based on selection of the one or more links.

According to some possible implementations, the data describing the set of actions may further identify a set of geolocations associated with each of the points in time.

According to some possible implementations, the score is a first score, and the one or more computers may further analyze the data to determine a second score for each of the set of geolocations, where the second score, for a particular geolocation of the set of geolocations, may be determined from a number of times that the user performed the action at the particular geolocation.

According to some possible implementations, the one or more computers, when providing the user with the functionality to perform the particular action, may identify the first score for the one of the set of points in time; identify the second score for one of the set of geolocations associated with the user at the one of the set of points in time; determine that each of the first score and the second score satisfies a respective threshold; and provide the user with the functionality to perform the particular action when each of the first score and the second score satisfies the respective threshold.

According to some possible implementations, the one or more computers, when providing the user with the functionality to perform the particular action, may identify the first score for the one of the set of points in time; identify the second score for one of the set of geolocations associated with the user at the one of the set of points in time; generate an overall score based on a combination of the first score and the second score; determine that the overall score satisfies a threshold; and provide the user with the functionality to perform the particular action when the overall score satisfies the threshold.

According to some possible implementations, the score, for the particular point in time, may be determined from a number of times that the user performed the action at the particular point in time within a time period.

According to some possible implementations, a computer storage medium may store instructions, where the instructions may include a set of instructions which, when executed by one or more processors, cause the one or more processors to: obtain data for a user, where the data may describe a set of actions that the user has performed in an application, where the data may identify points in time associated with the set of actions, and where each of one or more of the points in time, associated with one of the set of actions, may include a point in time at which the one of the set of actions was performed; analyze the data to determine, for each action of one or more of the set of actions, a score for each of a set of points in time, where the score, for a particular point in time of the set of points in time, may be determined based on the one or more of the points in time at which the action was performed, and may be determined from a number of times that the action was performed at the particular point in time; and provide the user with a functionality to perform a particular action, of the one or more of the set of actions, at one of the set of points in time based on the scores determined for the particular action for the set of points in time.

According to some possible implementations, the set of instructions, which when executed by the one or more processors, may further cause the one or more processors to obtain a histogram that identifies a number of times that each of the set of the actions has been performed at each of the set of points in time.

According to some possible implementations, the data describing the set of actions may further identify a set of client devices associated with each of the points in time.

According to some possible implementations, the score is a first score, and the set of instructions, which when executed by the one or more processors, may further cause the one or more processors to analyze the data to determine a second score for each of the set of client devices, where the second score, for a particular client device of the set of client devices, may be determined from a number of times that the user performed the action using the particular client device.

According to some possible implementations, the set of instructions, which when executed by the one or more processors, may further cause the one or more processors to: identify the first score for the one of the set of points in time; identify the second score for one of the set of client devices associated with the user at the one of the set of points in time; determine that each of the first score and the second score satisfies a respective threshold; and provide the user with the functionality to perform the particular action when each of the first score and the second score satisfies the respective threshold.

According to some possible implementations, the set of instructions, which when executed by the one or more processors, may further cause the one or more processors to: identify the first score for the one of the set of points in time; identify the second score for one of the set of client devices associated with the user at the one of the set of points in time; generate an overall score based on a combination of the first score and the second score; determine that the overall score satisfies a threshold; and provide the user with the functionality to perform the particular action when the overall score satisfies the threshold.

According to some possible implementations, a system may include means for obtaining data for a user, where the data may describe a set of actions that the user has performed in an application, where the data may identify points in time associated with the set of actions, and where each of one or more of the points in time, associated with one of the set of actions, may include a point in time at which the one of the set of actions was performed; means for analyzing the data to determine, for each action of one or more of the set of actions, a score for each of a set of points in time, where the score, for a particular point in time of the set of points in time, may be determined based on the one or more of the points in time at which the action was performed, and may be determined from a number of times that the action was performed at the particular point in time; and means for providing the user with a functionality to perform a particular action, of the one or more of the set of actions, at one of the set of points in time based on the scores determined for the particular action for the set of points in time.

The above discussion mentions examples in which some implementations may be implemented via one or more methods performed by one or more processors of one or more devices. In some implementations, one or more systems and/or one or more devices may be configured to perform one or more of the acts mentioned above. In some implementations, a computer-readable medium may include computer-executable instructions which, when executed by one or more processors, cause the one or more processors to perform one or more of the acts mentioned above.

BRIEF DESCRIPTION OF THE DRAWINGS

Like reference numbers and designations in the various drawings indicate like elements.

DETAILED DESCRIPTION

The subject matter described in this specification can be implemented in particular embodiments so as to realize one or more of the following advantages. Common occurrence contexts for actions performed by users in applications can be determined. Users can be provided with notifications that include functionalities to perform the actions at the common occurrence contexts. Users can use the provided functionalities to perform the frequent actions without needing to access the applications.

Figure 1:
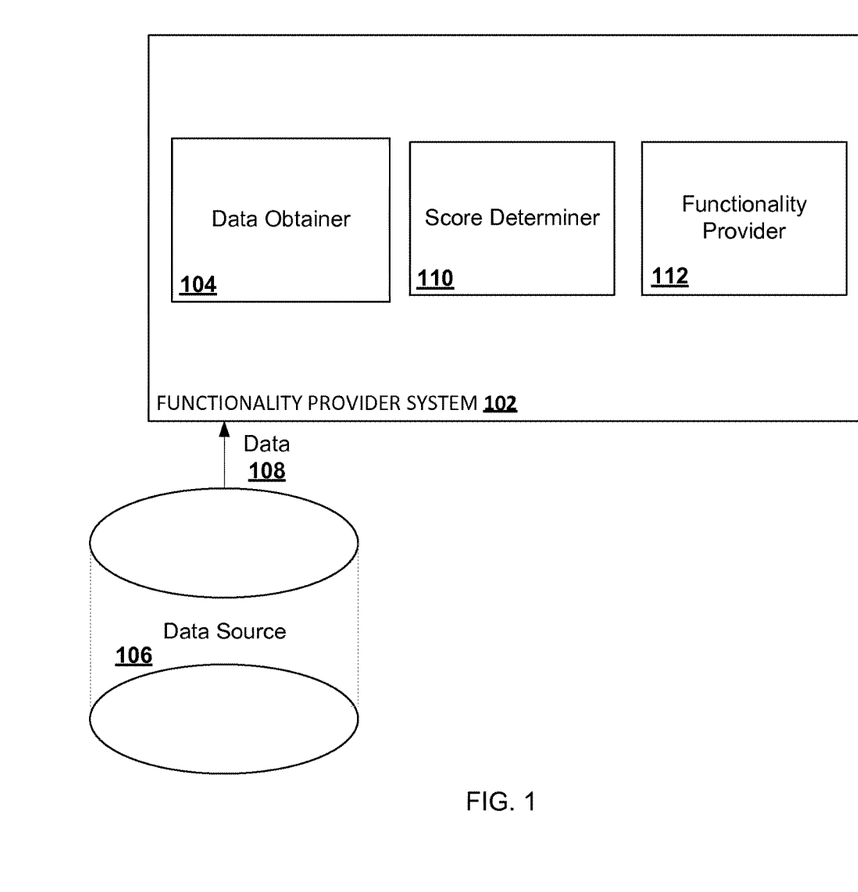
FIG. 1 illustrates an example functionality provider system.

FIG. 1 illustrates an example functionality provider system 102 as can be implemented for use in an Internet, an intranet, or another client and server environment. The functionality provider system 102 can be implemented as, for example, computer programs running on one or more computers in one or more locations that are coupled to each other through a network. The systems, components, and techniques described below can be implemented in the example functionality provider system.

The functionality provider system 102 includes a data obtainer 104, a score determiner 110, and a functionality provider 112. The functionality provider system 102 can communicate with a data source 106 through one or more wired or wireless networks, e.g., mobile phone networks, local area networks (LANs), or wide area networks (WANs), e.g., the Internet. In some implementations, data source 106 can be one or more data sources. For example, the functionality provider system 102 can communicate with one or more databases that contain data about one or more users. In some implementations, the one or more databases can contain data describing actions that users perform in applications on client devices. An application is any program or group of programs that can be run on a client device, e.g., a personal computer or mobile device. For example, this data can be obtained from a database of user data. The database contains entries for users. Each entry is associated with a user and describes the actions performed by the user across one or more applications.

An action is any act that a user can perform in an application through an interaction with the application. Examples of actions include archiving emails, deleting emails, confirming meeting requests, rejecting meeting requests, sharing information on social networks, and accessing electronic documents. Other examples of actions include setting client device settings, e.g., device screen brightness and volume, opening applications, waking client device from sleep, making phone calls, and sending text messages.

In situations in which the systems discussed here collect user data, or may make use of user data, the users may be provided with an opportunity to control whether programs or features collect user information, or to control whether and/or how to receive content from the systems that may be more relevant to the user. Thus, the user may have control over how information is collected about the user and used by the systems.

The data describing the actions performed by the user can describe specific instances that a particular action was performed. The data can describe an occurrence context for each instance that the particular action was performed. An occurrence context for a particular action describes the circumstances in which the user performed a particular instance of the action. For example, the data can include a point in time associated with each instance that the user performed the particular action. The point in time associated with an instance of the particular action represents a point in time that the instance of the particular action was performed by the user. The point in time can be an exact time measurement, e.g., 7:43 a.m. or 9:28 p.m. Alternatively, the point in time can be a relative time measurement of the occurrence of the instance of the particular action relative to an event. For example, if a user confirms a meeting request five minutes before the start of the meeting, the database entry associated with the user can describe that the user confirmed the meeting request five minutes before the start of the meeting. As a further example, the data can identify an application associated with each instance that the user performed the particular action. The application associated with an instance of the particular action is the application that the user used to perform the particular instance of the action. Other data can be stored for each instance that a particular action was performed, for example, the specific client device that was used to perform the instance of the action, and the geolocation where the instance of the action was performed. For example, the database entry can additionally describe that the user confirmed the meeting request on a specific client device at a geolocation that identifies the user's work place.

In some implementations, data describing actions that users perform in applications can be obtained directly from third parties. For example, actions performed by users in a third party application can be directly obtained from the third party.

The data obtainer 104 obtains data 108 from the data source 106, as described in more detail below with reference to FIG. 2. The data can be obtained from one or more data sources 106 that describe actions that users perform, as described above. In some implementations, the data obtainer 104 obtains data 108 for a single user. In other implementations, the data obtainer 104 obtains data 108 for multiple users.

The score determiner 110 analyzes the data 108 obtained by the data obtainer 104. The data 108 identifies different actions that have been performed in applications. For each of the different actions, the score determiner 110 determines a score for one or more candidate occurrence contexts from the obtained data 108, as described in more detail below with reference to FIG. 2. The score for a candidate occurrence context for a particular action is a measure of the association of the particular action with the candidate occurrence context based on the data. In some implementations, the score determiner 110 determines a score for one or more candidate points in time, as described in more detail below with reference to FIG. 3.

The score for a candidate point in time for a particular action is a measure of the association of the particular action with the candidate point in time from the data. In some implementations, the score determiner 110 determines a score for one or more candidate geolocations from the obtained data 108, as described in more detail below with reference to FIG. 4. The score for a candidate geolocation for a particular action is a measure of the association of the particular action with the candidate geolocation as determined from the data.

In some implementations, the score determiner 110 determines a score for one or more candidate client devices from the obtained data 108, as described in more detail below with reference to FIG. 5. The candidate client devices can be the different client devices used by a user to perform a particular action. The score for a candidate client device for the particular action is a measure of the association of the particular action with the candidate client device as determined from the data. In some implementations, the scores are determined from data obtained for a single user. For example, the scores for different candidate points in time can be determined from data describing the actions performed by just the single user. In other implementations, the scores are determined from data obtained for multiple users. For example, the scores for different candidate points in time can be determined from data describing actions performed by the multiple users.

The functionality provider 112 verifies candidate occurrence contexts for an action based on their respective scores, as described below with reference to FIG. 2. The functionality provider 112 provides one or more users with a functionality to perform the action at the one or more verified occurrence contexts, as described in more detail below with reference to FIG. 2 and FIGS. 6A-6D. In other implementations, the functionality provider 112 determines whether to provide the functionality to perform the action based on a combination of a current point in time, a geolocation of the user, and a client device, as described in more detail below with reference to FIG. 2.

Figure 2:
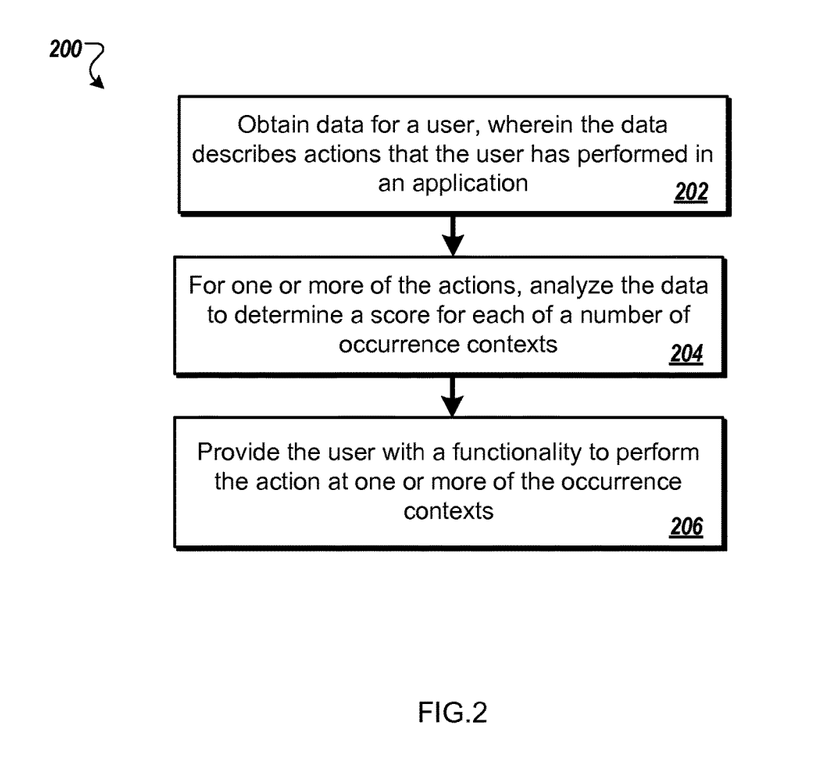
FIG. 2 illustrates an example method for providing a functionality to a user.

FIG. 2 illustrates an example method for providing a functionality to a user. For convenience, the example method 200 will be described in reference to a system that performs method 200. The system can be, for example, the functionality provider system 102 described above with reference to FIG. 1. In some implementations, the system can be one or more computers.

The system obtains data for a user (202). The data describes actions that the user has performed in an application. The data further describes occurrence contexts for each of the actions. For example, the occurrence context for a particular instance of the action can include a point in time at which the user performed the instance of the action. Alternatively, or additionally, the occurrence context obtained by the system can additionally describe a client device and/or a geolocation associated with each of the instances that the user performed the action. The data describing a client device associated with a particular instance of the performed action identifies a specific client device that the user used to perform the particular instance of the action. The data describing a geolocation associated with a particular instance of the performed action identifies a geolocation at which the user performed the particular instance of the action. The occurrence context can include other information that describes the circumstances in which the actions were performed. The system can obtain the data describing the actions from a database containing user data, as described above. In some implementations, the system can obtain data that describes actions that have been performed by one or more other users. For example, if the system is unable to obtain user data for the user, the system can obtain user data for the one or more other users instead.

In some implementations, the system can obtain data representing a graphical representation, e.g., a histogram, that describes the actions that the user has performed in an application. The data can represent the graphical distribution of the actions performed by the user as a function of the occurrence contexts at which the actions were performed. For example, the data can describe the number of times that the user has performed a particular action at a particular occurrence context, e.g., point in time, geolocation, and client device. Alternatively, the data can represent a graphical probability distribution. For example, the data can describe a probability that the user performed a particular action at each of a number of occurrence contexts. The probability for a particular occurrence context is a function of the number of times that the action has been performed in circumstances that match the particular occurrence context and the total number of times that the action has been performed by the user. In some implementations, the system can obtain data that represents a different graphical representation for each of the actions performed by the user in the application. In other implementations, the system can obtain data that represents a graphical representation for all the actions that the user has performed in the application.

For one or more of the actions, the system analyzes the data to determine a score for each of a number of occurrence contexts (204). For each of the one or more actions, the system analyzes the obtained data describing the instances in which the user performed a particular action. From the data, the system determines a score for different candidate occurrence contexts. A candidate occurrence context can be any combination of circumstances in which the action can be performed. For example, a candidate occurrence context can include a point in time in which the action can be performed, a geolocation at which the action can be performed, and a client device on which the action can be performed.

The system determines a score for each of the candidate occurrence contexts for the particular action. The system determines a score for a candidate occurrence context from the data obtained by the system. For example, the system determines a score for the point in time defined by the candidate occurrence context, as described below with reference to FIG. 3. Additionally, or alternatively, the system determines a score for the geolocation defined by the candidate occurrence context, as described below with reference to FIG. 4. Additionally, or alternatively, the system determines a score for the client device defined by the candidate occurrence context, as described below with reference to FIG. 5. In some implementations, the system inputs the scores for the candidate occurrence context, e.g., the scores for the point in time, geolocation, and client device defined by the candidate occurrence context, into a function that outputs an overall score for the candidate occurrence context. For example, the scores can be summed, multiplied, or divided, and can be scaled or weighted.

The system provides the user with a functionality to perform the action at one or more of the occurrence contexts (206). The system determines which of the candidate occurrence contexts have overall scores that satisfy the threshold. The system takes no further action for candidate occurrence contexts with scores that do not satisfy a threshold. The candidate occurrence contexts with scores that satisfy the threshold are verified occurrence contexts. The system provides the user with the functionality to perform the action at the verified occurrence contexts. For example, the user is provided with the functionality at the point in time and client device defined by a verified occurrence context if the user is also physically located at the geolocation as defined by the verified occurrence context. In some implementations, the system provides the user with the functionality if the scores for each of the contexts defined by a candidate occurrence context satisfy a respective context threshold score. In other implementations, the system provides the user with the functionality if a predetermined number of contexts have scores that satisfy respective context threshold scores.

In some implementations, the system can identify verified occurrence contexts for the user from the verified occurrence contexts for other users. For example, the system can determine verified occurrence contexts for other users that are similar to the user. The similarity between the user and the other users can be determined from their respective online profiles. A user's online profile describes activity for the particular user across various web properties, e.g., web search history, social network information, consumed media, location history, check-ins, and other sources. Users with similar online profiles can be identified as similar users. In some implementations, occurrence contexts that are verified occurrence contexts for a threshold number of similar users can be identified as verified occurrence contexts for the user. In other implementations, occurrence contexts that are verified occurrence contexts for a threshold proportion of similar users can be identified as verified occurrence contexts for the user.

In some implementations, the system can provide the functionality to the user by providing the user with one or more links. The one or more links can be presented on a display screen of the user's client device. The user can use one or more user interface devices, e.g., keyboard, mouse, or touch sensitive display, associated with the client device to interact with the one or more links to perform the action. In some implementations, the system can provide the functionality to the user by presenting a graphical user interface to the user. The graphical user interface includes a notification object. The notification object notifies the user that the action can be performed directly from the notification object, as described in more detail below with reference to FIG. 3. For example, the notification object can include the one or more links that the user can interact with to perform the action. In response to receiving an interaction from the user with the one or more links, the system causes the user's client device to run an application that can perform the action. Alternatively, the system can open a web browser application on the user's client device. The system sends a webpage from which the user can perform the action to the web browser.

Figure 3:
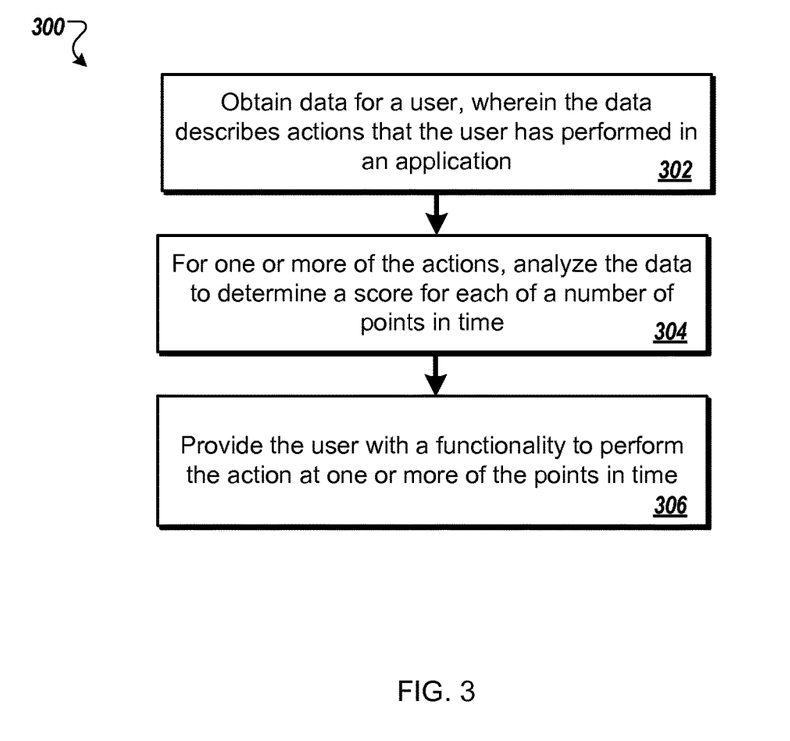
FIG. 3 illustrates another example method for providing a functionality to a user.

FIG. 3 illustrates another example method for providing a functionality to a user. For convenience, the example method 300 will be described in reference to a system that performs method 300. The system can be, for example, the functionality provider system 102 described above with reference to FIG. 1. In some implementations, the system can be one or more computers.

The system obtains data for a user (302), as described above with reference to FIG. 2

For one or more of the actions, the system analyzes the data to determine a score for each of a number of points in time (304). For each of the one or more actions, the system analyzes the obtained data describing the instances that the user performed a particular action. From the data, the system determines a score for different candidate points in time. In some implementations, the candidate points in time can be predetermined for the particular action. For example, for the actions of confirming or rejecting meeting requests, a predetermined candidate point in time can be a time range immediately prior to the meeting. In some implementations, the candidate points in time can be any time that can be measured by a time keeping instrument, e.g., a timepiece, clock, and watch. For example, the candidate points in time can be any time value between 12:00 a.m. and 11:59 p.m. In some implementations, the candidate points in time can be any interval or range of times. For example, hourly intervals between 12:00 a.m. and 11:59 p.m. can be candidate points in time.

The system determines a score for each of the candidate points in time for the particular action. The system determines a score for a candidate point in time from the data obtained by the system. In some implementations, the system determines a score for a candidate point in time from the number of times that the user has performed the particular action at the candidate point in time. The points in time associated with the different instances that the user performed the particular action are correlated with the candidate points in time. Candidate points in time with a greater number of correlations are assigned greater scores than candidate points in time with fewer correlations. For example, if the data describes twenty instances of the user archiving emails between the times of 8:00 a.m. and 8:10 a.m. and five instances of the user archiving emails between the times of 9:00 a.m. and 9:10 a.m., the candidate point in time for a time range between 8:00 a.m. and 8:30 a.m. is assigned a greater score than the candidate point in time for a time range between 9:00 a.m. and 9:30 a.m. for the action of archiving emails.

In some implementations, the system determines a score for a candidate point in time from the number of times that the user has performed the particular action at the candidate point in time within a time period. The time period can be any amount of time. The time period can be from the date that the system is determining the score. For example, the system determines a score for a candidate point in time from the number of times that the user has performed the particular action at the candidate point in time within the last two months. In some implementations, each of the number of times that the user has performed the particular action at the candidate point in time can be weighted based on how recent the particular action was performed. Greater weight can be given to the more recent times that the user has performed the particular action. For example, if the user has performed the particular action the same number of times at two candidate points in time within the last week, the candidate point in time where the user performed the action more recently is assigned a greater score. In some implementations, the system determines the score for a candidate point in time from the change in the number of times that the user has performed the particular action at the candidate point in time within a particular time period compared to an earlier time period. For example, candidate points in time with greater increases in the number of times that the user has performed the particular action at the points in time in the last month compared to the previous month are assigned greater scores than candidate points in time that experienced lesser increases.

The system provides the user with a functionality to perform the action at one or more of the points in time (306). The system determines which of the candidate points in time have assigned scores that satisfy a threshold. The system takes no further action for candidate points in time with assigned scores that do not satisfy the threshold. The candidate points in time with scores that satisfy the threshold are verified points in time. The system provides the user with the functionality to perform the action at the verified points in time at the user's client device. In instances where the verified point in time is an interval or range of times, the functionality can be provided at any point in time within the interval or range of time. The functionality can be provided as described above with reference to FIG. 2.

Figure 4:
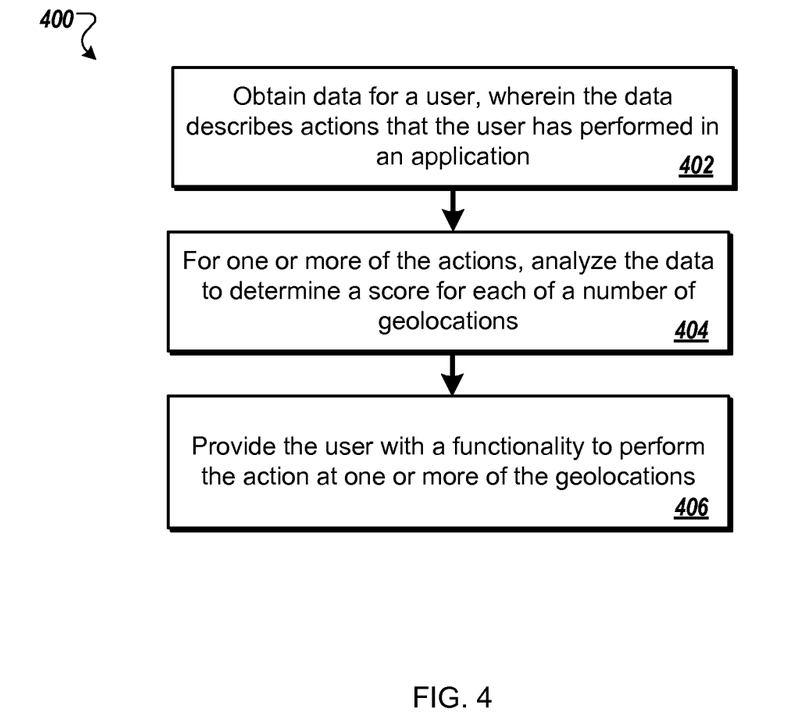
FIG. 4 illustrates another example method for providing a functionality to a user.

FIG. 4 illustrates another example method for providing a functionality to a user. For convenience, the example method 400 will be described in reference to a system that performs method 400. The system can be, for example, the functionality provider system 102 described above with reference to FIG. 1. In some implementations, the system can be one or more computers.

The system obtains data for a user (402), as described above with reference to FIG. 2

For one or more of the actions, the system analyzes the data to determine a score for each of a number of geolocations (404). For each of the one or more actions, the system analyzes the obtained data describing the instances that the user performed a particular action. From the data, the system determines a score for different candidate geolocations. The candidate geolocations can be identified from the geolocations associated with the instances that the particular action was performed. The system determines a score for a candidate geolocation from the number of times that the user performed the particular action when within a predetermined distance from the candidate geolocation. The geolocations associated with the different instances that the user performed the particular action are correlated with the candidate geolocations. For example, a geolocation can be correlated with a candidate geolocation if the geolocation is within a predetermined distance from the candidate geolocation. Candidate geolocations with a greater number of correlations are assigned greater scores than candidate geolocations with fewer correlations. For example, if the data describes thirty instances of the user sharing information on a social network from a geolocation that identifies the user's home and two instances of the user sharing information on a social network from a geolocation that identifies the user's work place, the candidate geolocation that includes the user's home is assigned a greater score than the candidate geolocation that includes the user's work place for the action of sharing information on a social network.

In some implementations, the system determines a score for a candidate geolocation from the number of times that the user has performed the particular action when within a predetermined distance from the candidate geolocation within a time period. The time period can be any amount of time. The time period can be from the date that the system is determining the score. For example, the system determines a score for a candidate geolocation from the number of times that the user has performed the particular action when within a predetermined distance from the candidate geolocation within the last two months. In some implementations, each of the number of times that the user has performed the particular action when within a predetermined distance from the candidate geolocation can be weighted based on how recent the particular action was performed. Greater weight can be given to the more recent times that the user has performed the particular action. For example, if the user has performed the particular action the same number of times at two candidate geolocations within the last week, the candidate geolocation from which the user performed the action more recently is assigned a greater score. In some implementations, the system determines the score for a candidate geolocation from the change in the number of times that the user has performed the particular action at the candidate geolocation within a particular time period compared to an earlier time period. For example, candidate geolocations with greater increases in the number of times from which the user has performed the particular action when within a predetermined distance from the geolocations in the last month compared to the previous month are assigned greater scores than candidate geolocations that experienced lesser increases.

The system provides the user with a functionality to perform the action at one or more of the geolocations (406). The system determines which of the candidate geolocations have assigned scores that satisfy a threshold. The candidate geolocations with scores that satisfy the threshold are verified geolocations. The system provides the user with the functionality to perform the action when the user is located within a predetermined distance from the verified geolocations. A positioning system, for example, a Global Positioning System receiver or Wi-Fi positioning system embedded in the user's client device, can determine the location of the user. The functionality can be provided as described above with reference to FIG. 2.

Figure 5:
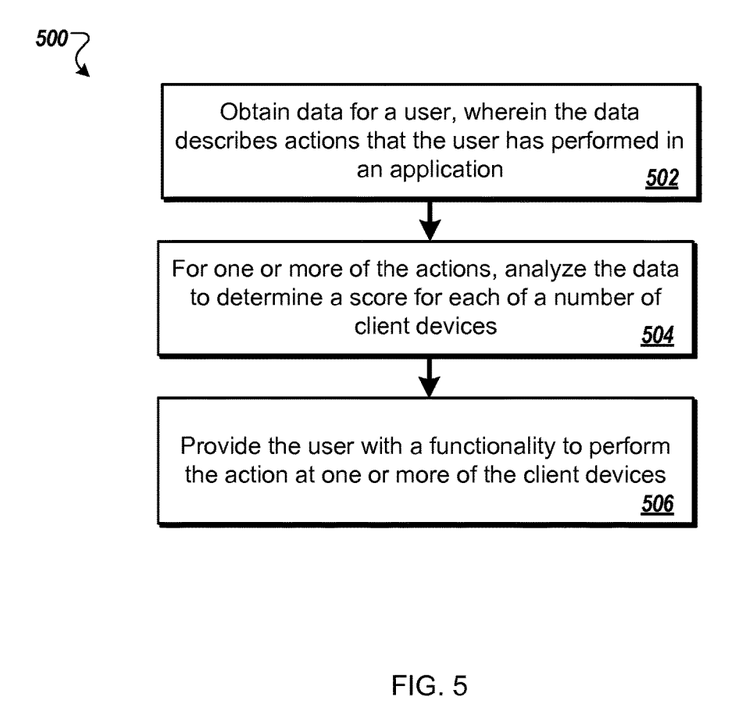
FIG. 5 illustrates another example method for providing a functionality to a user.

FIG. 5 illustrates another example method for providing a functionality to a user. For convenience, the example method 500 will be described in reference to a system that performs method 500. The system can be, for example, the functionality provider system 102 described above with reference to FIG. 1. In some implementations, the system can be one or more computers.

The system obtains data for a user (502), as described above with reference to FIG. 2

For one or more of the actions, the system analyzes the data to determine a score for each of a number of client devices. For each of the one or more actions, the system analyzes the obtained data describing the instances that the user performed a particular action. From the data, the system determines a score for different candidate client devices. The candidate client devices can be identified from the client devices associated with the instances that the particular action was performed, e.g., the different client devices used by the user to perform the particular action. The system determines a score for a candidate client device from the number of times that the user has performed the particular action using the candidate client device. The client devices associated with the different instances that the user performed the particular action are correlated with the candidate client devices. For example, a client device can be correlated with a candidate client device if a unique identifier for the client device and candidate client device match. Candidate client devices with a greater number of correlations are assigned greater scores than candidate client devices with fewer correlations. For example, if the data describes forty instances of the user accessing an electronic document, e.g., the webpage identified by www.espn.com, on a tablet device and one instance of the user accessing the webpage from a mobile phone, the candidate table device is assigned a greater score than the candidate mobile phone device for the action of accessing the electronic document.

In some implementations, the system determines a score for a candidate client device from the number of times that the user has performed the particular action using the candidate client device within a time period. The time period can be any amount of time. The time period can be from the date that the system is determining the score. For example, the system determines a score for a candidate client device from the number of times that the user has performed the particular action using the candidate client device within the last two months. In some implementations, each of the number of times that the user has performed the particular action using the candidate client device can be weighted based on how recent the particular action was performed. Greater weight can be given to the more recent times that the user has performed the particular action. For example, if the user has performed the particular action the same number of times using two candidate client devices within the last week, the candidate client device with which the user performed the action more recently is assigned a greater score. In some implementations, the system determines the score for a candidate client device from the change in the number of times that the user has performed the particular action using the candidate client device within a particular time period compared to an earlier time period. For example, candidate client devices with greater increases in the number of times that the user has performed the particular action using the client devices in the last month compared to the previous month are assigned greater scores than candidate client devices that experienced lesser increases.

The system provides the user with a functionality to perform the action at one or more client devices (506). The system determines which of the candidate client devices have assigned scores that satisfy a threshold. The candidate client devices with scores that satisfy the threshold are verified client devices. The system provides the user with the functionality to perform the action on the one or more verified client devices. The functionality can be provided as described above with reference to FIG. 2.

FIGS. 6A-6D illustrate example graphical user interfaces for providing example functionalities to a user.

Figure 6A:
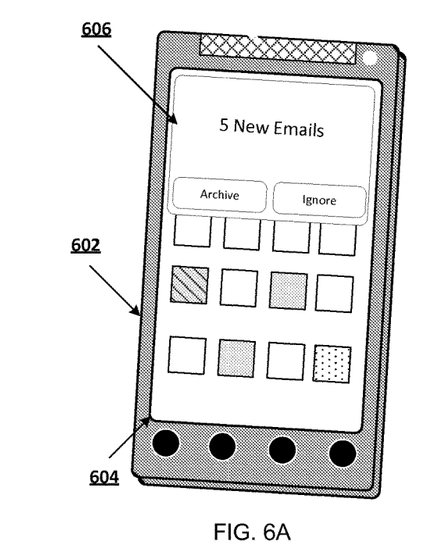
FIGS. 6A-6D illustrate example graphical user interfaces for providing example functionalities to a user.

In FIG. 6A, a system, for example the functionality provider system 102 described above with reference to FIG. 1, obtains data for a user. The data describes several instances of the user archiving unread emails in an email application running on the user's client device 602. Based on a combination of a current point in time, a geolocation of the client device 602, and the client device, the system determines a score for the action of archiving unread emails, as described above. In response to the score satisfying a predetermined threshold, the system provides the user with a functionality to archive emails. The system causes a graphical user interface 606 to be presented on a display screen 604 on the user's client device 602. The graphical user interface 606 includes a notification object. The notification object allows the user to directly archive emails in the email application from the graphical user interface 606 without accessing the email application itself. For example, the user can interact with the "Archive" link in the graphical user interface, which causes the email application to archive unread emails. Alternatively, the user can interact with the "Ignore" link in the graphical user interface, which causes the notification object to be dismissed.

Figure 6B:
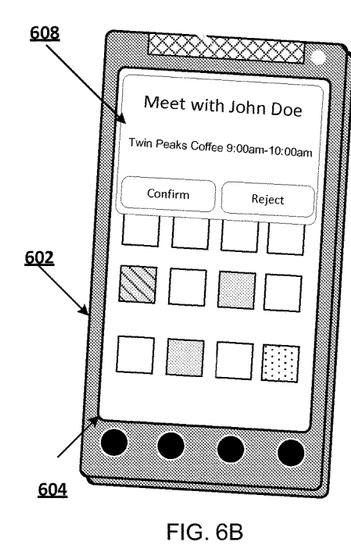

In FIG. 6B, the system obtains data for the user. The data describes several instances of the user confirming or rejecting meeting requests in a calendar application running on the user's client device 602. Based on a combination of a current point in time, a geolocation of the client device 602, and the client device, the system determines a score for the action of confirming or rejecting meeting requests, as described above. In response to the score satisfying a predetermined threshold, the system provides the user with a functionality to confirm or reject meeting requests. The system causes a graphical user interface 608 to be presented on a display screen 604 on the user's client device 602. The graphical user interface 608 includes a notification object. The notification object allows the user to directly confirm or reject meeting requests in the calendar application from the graphical user interface without accessing the calendar application itself. For example, the user can interact with the "Confirm" link in the graphical user interface 308, which causes the calendar application to confirm the meeting request. Alternatively, the user can interact with the "Reject" link in the graphical user interface, which causes the calendar application to reject the meeting request.

Figure 6C:
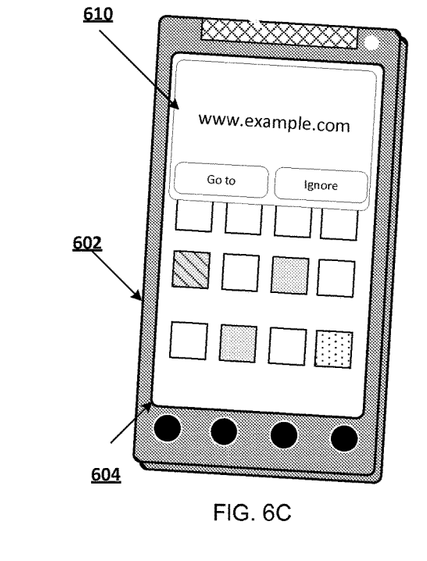

In FIG. 6C, the system obtains data for the user. The data describes several instances of the user accessing the webpage identified by the URL www.example.com in a web browser application running on the user's client device 602. Based on a combination of a current point in time, a geolocation of the client device 602, and the client device, the system determines a score for the action of accessing the webpage identified by the URL www.example.com, as described above. In response to the score satisfying a predetermined threshold, the system provides the user with a functionality to access the webpage. The system causes a graphical user interface 610 to be presented on a display screen 604 on the user's client device 602. The graphical user interface 610 includes a notification object. The notification object allows the user to directly access the webpage from the graphical user interface 610 without first accessing the web browser application itself. For example, the user can interact with the "Go to" link in the graphical user interface, which causes the web browser application to open and access the webpage identified by the URL www.example.com. Alternatively, the user can interact with the "Ignore" link in the graphical user interface, which causes the notification object to be dismissed.

Figure 6D:
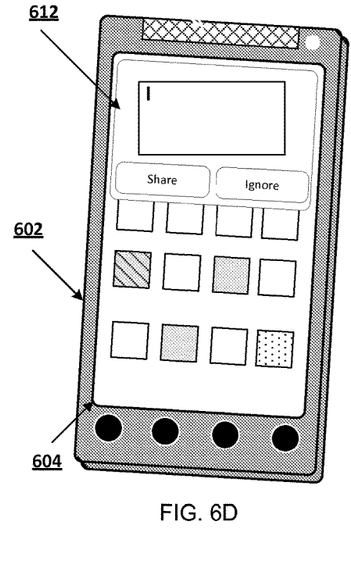

In FIG. 6D, the system obtains data for the user. The data describes several instances of the user sharing information on a social network using a social networking application running on the user's client device 602. Based on a combination of a current point in time, a geolocation of the client device 602, and the client device, the system determines a score for the action of sharing information on a social network, as described above. In response to the score satisfying a predetermined threshold, the system provides the user with a functionality to share information on a social network. The system causes a graphical user interface 612 to be presented on a display screen 604 on the user's client device 602. The graphical user interface 612 includes a notification object. The notification object allows the user to share information on a social network from the graphical user interface 612 without accessing the social network application itself. For example, the user can enter text into a textbox in the graphical user interface. The user can then interact with the "Share" link in the graphical user interface, which causes the social network application to share the text in the textbox on the social network. Alternatively, the user can interact with the "Ignore" link in the graphical user interface, which causes the notification object to be dismissed.

An electronic document, which for brevity will simply be referred to as a document, may, but need not, correspond to a file. A document may be stored in a portion of a file that holds other documents, in a single file dedicated to the document in question, or in multiple coordinated files.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of the implementations or on the scope of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

No element, act, or instruction used in the present application should be construed as critical or essential to the disclosed implementations unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

The invention claimed is:

1. A method comprising:
   obtaining, by one or more computer devices, data for a user,
     the data describing a plurality of actions that the user has performed in an application,
     the data identifying points in time associated with the plurality of actions, and
     the points in time including:
       a particular point in time at which a particular action, of the plurality of actions, was performed, the particular point in time being a relative time measurement that is relative to a start of one or more events and that is prior to the start of the one or more events;
   analyzing, by the one or more computer devices, the data to determine, for the particular action for the particular point in time, a score based on a number of times that the particular action was performed at the particular point in time; and
   providing, by the one or more computer devices, the user with a functionality to perform the particular action at an occurrence of the particular point in time, wherein the providing is based on the score, and wherein the score is utilized in the providing based on the score corresponding to the particular point in time and the occurrence being of the particular point in time.

2. The method of claim 1, where providing the user with the functionality comprises:
   providing the user with one or more links,
   the particular action being performed based on selection of the one or more links.

3. The method of claim 1, where the data comprises a histogram that identifies the number of times that the particular action was performed at the particular point in time and numbers of times that one or more other actions, of the plurality of the actions, were performed at other points of time of the points in time.

4. The method of claim 1, where the data further identifies a plurality of geolocations and a plurality of client devices associated with the points in time.

5. The method of claim 4,
   where the score is a first score, and
   where the method further comprises:
   analyzing the data to determine a second score based on a number of times that the user performed the particular action at a particular geolocation of the plurality of geolocations; and
   analyzing the data to determine a third score based on a number of times that the user performed the particular action using a particular client device of the plurality of client devices.

6. The method of claim 5, where providing the user with the functionality to perform the particular action comprises:
   identifying the first score for the particular point in time;
   identifying the second score for the particular geolocation associated with the user at the particular point in time;
   identifying the third score for the particular client device associated with the user at the particular point in time;
   determining that each of the first score, the second score, and the third score satisfies a respective threshold; and
   providing the user with the functionality to perform the particular action based on determining that each of the first score, the second score, and the third score satisfies the respective threshold.

7. The method of claim 5, where providing the user with the functionality to perform the particular action comprises:
   identifying the first score for the particular point in time;
   identifying the second score for the particular geolocation associated with the user at the particular point in time;
   identifying the third score for the particular client device associated with the user at the particular point in time;
   generating an overall score based on a combination of the first score, the second score, and the third score;
   determining that the overall score satisfies a threshold; and
   providing the user with the functionality to perform the particular action based on determining that the overall score satisfies the threshold.

8. The method of claim 1, wherein the points in time further include an additional particular point in time at which the particular action was performed, and further comprising:
   analyzing, by the one or more computer devices, the data to determine, for the particular action for the additional particular point in time, an additional score based on a number of times that the particular action was performed at the additional particular point in time; and
   providing, by the one or more computers, the user with the functionality to perform the particular action at an occurrence of the additional particular point in time, wherein the providing is based on the additional score, and wherein the additional score is utilized in the providing based on the additional score corresponding to the additional particular point in time and the occurrence being of the additional particular point in time.

9. The method of claim 1, wherein the particular point in time is a time period.

10. A system comprising:
    one or more computers to:
    obtain data for a user,
      the data describing a plurality of actions that the user has performed in an application,
      the data identifying points in time associated with the plurality of actions, and the points in time including:
   a particular point in time at which a particular action, of the plurality of actions, was performed, the particular point in time being a relative time measurement that is relative to a start of one or more events and that is prior to the start of the one or more events;
analyze the data to determine, for the particular action for the particular point in time, a score based on a number of times that the particular action was performed at the particular point in time; and
provide the user with a functionality to perform the particular action based on the score at an occurrence of the particular point in time, wherein the providing is based on the score, and wherein the score is utilized in the providing based on the score corresponding to the particular point in time and the occurrence being of the particular point in time.

11. The system of claim 10, where the one or more computers, when providing the user with the functionality, are to:
   provide the user with one or more links,
   the particular action being performed based on selection of the one or more links.

12. The system of claim 10, where the data further identifies a plurality of geolocations associated with the points in time.

13. The system of claim 12,
where the score is a first score, and
where the one or more computers are further to:
   analyze the data to determine a second score based on a number of times that the user performed the particular action at a particular geolocation of the plurality of geolocations.

14. The system of claim 13, where the one or more computers, when providing the user with the functionality to perform the particular action, are to:
   identify the first score for the particular point in time;
   identify the second score for the particular geolocation associated with the user at the particular point in time;
   determine that each of the first score and the second score satisfies a respective threshold; and
   provide the user with the functionality to perform the particular action based on determining that each of the first score and the second score satisfies the respective threshold.

15. The system of claim 13, where the one or more computers, when providing the user with the functionality to perform the particular action, are to:
   identify the first score for the particular point in time;
   identify the second score for the particular geolocation associated with the user at the particular point in time;
   generate an overall score based on the first score and the second score;
   determine that the overall score satisfies a threshold; and
   provide the user with the functionality to perform the particular action based on determining that the overall score satisfies the threshold.

16. The system of claim 10, where particular point in time is a time period.

17. A non-transitory computer storage medium storing instructions, the instructions comprising:
a plurality of instructions which, when executed by one or more processors, cause the one or more processors to:
   obtain data for a user,
   the data describing a plurality of actions that the user has performed in an application,
   the data identifying points in time associated with the plurality of actions, and
   the points in time including:
      a particular point in time at which a particular action, of the plurality of actions, was performed, the particular point in time being a relative time measurement that is relative to a start of one or more events and that is prior to the start of the one or more events;
   analyze the data to determine, for the particular action for the particular point in time, a score based on a number of times that the particular action was performed at the particular point in time; and
   provide the user with a functionality to perform the particular action at an occurrence of the particular point in time, wherein the providing is based on the score, and wherein the score is utilized in the providing based on the score corresponding to the particular point in time and the occurrence being of the particular point in time.

18. The non-transitory computer storage medium of claim 17, where the data further identifies a plurality of client devices associated with the points in time.

19. The non-transitory computer storage medium of claim 18, where the score is a first score, and
where the plurality of instructions, when executed by the one or more processors, further cause the one or more processors to:
analyze the data to determine a second score based on a number of times that the user performed the action using a particular client device of the plurality of client devices.

20. The non-transitory computer storage medium of claim 19, where one or more instructions, of the plurality of instructions, to provide the user with the functionality to perform the particular action, when executed by the one or processors, cause the one or more processors to:
   identify the first score for the particular point in time;
   identify the second score for the client device associated with the user at the particular point in time;
   determine that each of the first score and the second score satisfies a respective threshold; and
   provide the user with the functionality to perform the particular action based on determining that each of the first score and the second score satisfies the respective threshold.

21. The non-transitory computer storage medium of claim 19, where one or more instructions, of the plurality of instructions, to provide the user with the functionality to perform the particular action, when executed by the one or processors, cause the one or more processors to:
   identify the first score for the particular point in time;
   identify the second score for the client device associated with the user at the particular point in time;
   generate an overall score based on the first score and the second score;
   determine that the overall score satisfies a threshold; and
   provide the user with the functionality to perform the particular action based on determining that the overall score satisfies the threshold.

* * * * *